United States Patent
Tsubouchi et al.

(10) Patent No.: US 8,060,134 B2
(45) Date of Patent: Nov. 15, 2011

(54) COMMUNICATION TERMINAL

(75) Inventors: Masatoshi Tsubouchi, Kunitachi (JP);
Takashi Goto, Hachioji (JP); Chikara Yasuda, Tokyo (JP); Yue Zhang, Tachikawa (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 472 days.

(21) Appl. No.: 12/401,004

(22) Filed: Mar. 10, 2009

(65) Prior Publication Data
US 2010/0075711 A1  Mar. 25, 2010

(30) Foreign Application Priority Data
Sep. 22, 2008 (JP) ................................ P2008-243415

(51) Int. Cl.
*H04M 1/00* (2006.01)

(52) U.S. Cl. .................................. 455/553.1; 455/552.1

(58) Field of Classification Search .................... None
See application file for complete search history.

(56) References Cited

U.S. PATENT DOCUMENTS 7,826,842 B2 * 11/2010 Buckley et al. ............ 455/435.2
2009/0131048 A1 * 5/2009 Kuriyama ..................... 455/434

FOREIGN PATENT DOCUMENTS

JP 2006-217268 A 8/2006

* cited by examiner

*Primary Examiner* — Anh Tran
(74) *Attorney, Agent, or Firm* — Maschoff Gilmore & Israelsen (57) ABSTRACT

According to the embodiment of the invention, a communication apparatus including: a first communication module radio communicating based on a first radio access technology; a second communication module radio communicating based on a second radio access technology; a first information storing module storing radio access technology information indicating at least one of the first and second radio access technologies to be used in a radio communication of the communication apparatus; a chip storing module configured to store an information chip that stores company information with respect to a company providing a communication service; a search module configured to read out the company information from the information chip to perform a radio wave search according to one of the first and second radio access technologies based on the company information; and a setting module configured to set the radio access technology information in the first information storing module based on the result of the radio wave searching

6 Claims, 8 Drawing Sheets

| COUNTRY | COMMUNICATION COMPANY | RAT |
|---|---|---|
| JAPAN | SSS NNN KKK | UMTS |
| CHINA | CCCM | GSM |
| ⋮ | ⋮ | ⋮ |
| FRANCE | BBB | UMTS & GSM |

COMMUNICATION TERMINAL

CROSS-REFERENCE TO RELATED APPLICATIONS

This application is based upon and claims the benefit of priority from Japanese Patent Application No. 2008-243415, filed Sep. 22, 2008, the entire contents of which are incorporated herein by reference.

BACKGROUND

1. Field

The present invention relates to a communication apparatus such as a cell phone which car perform kinds of communication corresponding to different radio access technologies.

2. Description of the Related Art

UMTS (universal module telecommunications system), GRM (global system for mobile communications), etc. are employed as the above-mentioned radio access technologies (RATs) Among these technologies, UMTS is employed in Japan and known as WCDMA (wideband code division multiple access).

A cell phones (refer to JP-A-2006-217268) capable of receiving an overseas roaming service are equipped with a communication section which can accommodate both of the above-mentioned UMTS and GSM, and is configured in such a manner that the user himself or herself sets, through a setting picture of the cell phone, information of radio access technology employed by a communication company that operates a network in each country. Such setting is called RAT setting.

Such a cell phone capable of receiving an overseas roaming service is associated with a problem that if the user goes to a country where only GSM is supported with the RAT setting made to an UMTS only mode, no communication can be performed because of improper setting though the cell phone has a GSM communication function. To avoid this problem, an UMTS/GSM dual mode is provided.

If the RAT setting is made to the dual mode, a communication can be performed by a cell phone having the above function in either of a case that the user goes to a country where only UMTS is supported and a case that the user goes to a country where only GSM is supported. However, if the RAT setting is made to the dual mode, a radio wave search which accommodates both radio access technologies (UMTS and GSM) is performed every time. This results in a problem that the radio wave search time is long and the power consumption is increased.

SUMMARY OF THE INVENTION

According to an aspect of the present invention, there is provided a communication apparatus including: a first communication module radio communicating based on a first radio access technology; a second communication module radio communicating based on a second radio access technology; a first information storing module storing radio access technology information indicating at least one of the first and second radio access technologies to be used in a radio communication of the communication apparatus; a chip storing module configured to store an information chip that stores company information with respect to a company providing a communication service; a search module configured to read out the company information from the information chip to perform a radio wave search according to one of the first and second radio access technologies based on the company information; and a setting module configured to set the radio access technology information in the first information storing module based on the result of the radio wave searching.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
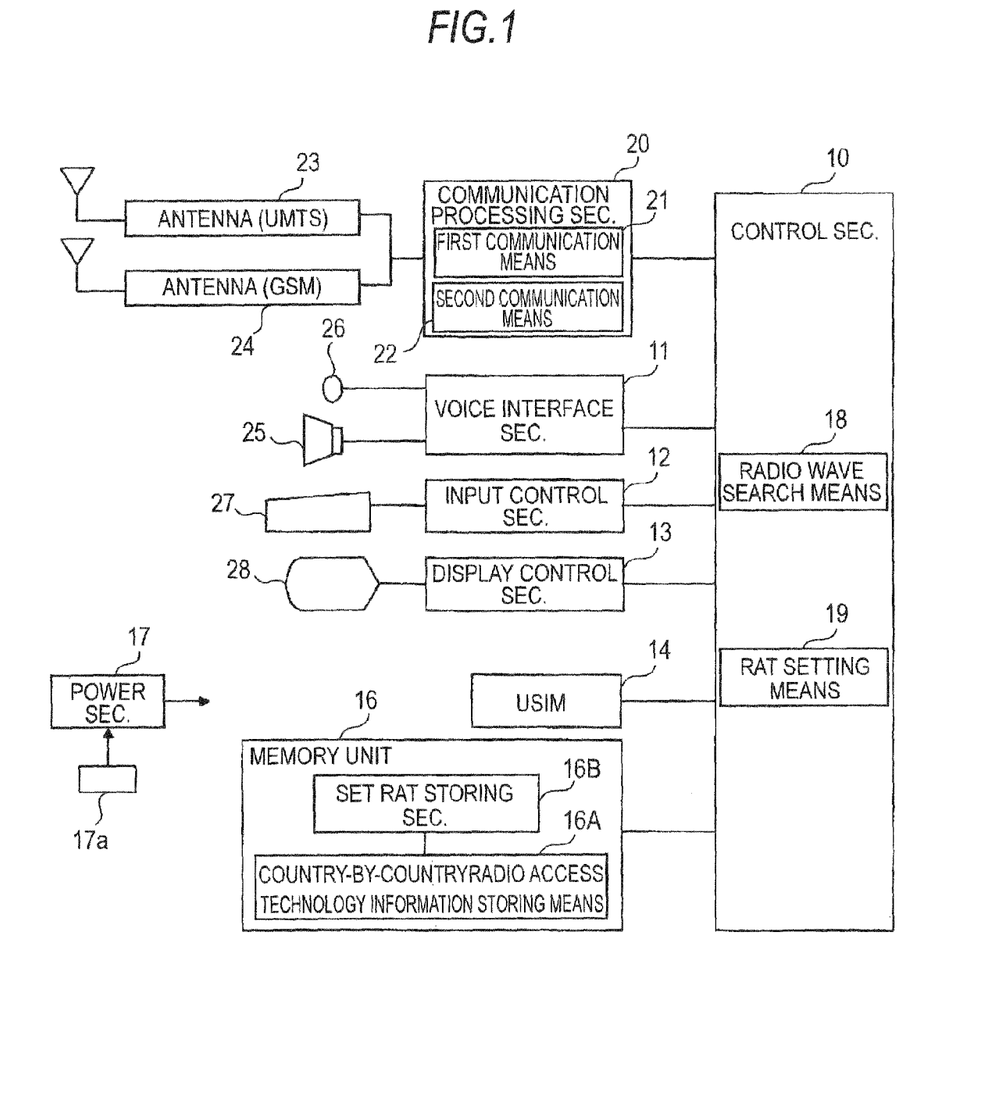
FIG. 1 is a block diagram showing the configuration of a cell phone (communication terminal apparatus) according to an embodiment of the invention.

A communication terminal apparatus according to an embodiment of the present invention will be hereinafter described with reference to the accompanying drawings. In the embodiment, the communication terminal apparatus is a cell phone. As shown in FIG. 1, the cell phone according to the embodiment is configured in such a manner that a control section 10 which is a CPU, for example, controls individual sections.

The control section 10 is equipped with a radio wave search means 18 and an RAT setting means 19. And a communication processing section 20, a voice interface section 11, an input control section 12, a display control section 13, a USIM (universal subscriber identity module) 14, and a memory unit 16 are connected to the control section 10. The cell phone is equipped with a power section 17 which supplies power to the individual sections after being turned on by a power switch 17a.

The communication processing section 20 is equipped with a first communication means 21 which performs a UTMS communication and a second communication means 22 which performs a GSM communication. And a UMTS antenna 23 and a GSM antenna 24 are connected to the communication processing section 20. A speaker 25 and a microphone 26 are connected to the voice interface section 11. As such, the voice interface section 11 outputs, to the speaker 25, a speech signal that is supplied via the control section 10 and thereby produces a voice. On the other hand, the voice interface section 11 converts a voice that is received through the microphone 20 into a speech signal and supplies it to the control section 10 so that it will be transmitted via the communication processing section 20.

A keyboard unit (including a case that it is embodied using a touch panel) 27 is connected to the input control section 12, whereby information including a text can be input. A key manipulation for turning on or off an off-line mode in which no on-line communication is performed can be made through the keyboard unit 27. A display unit 28 such as an LCD (liquid crystal display) is connected to the display control section 13 Under the control of the control section 10, the display control section 13 displays information such as a text on the display unit 28.

Figure 2:
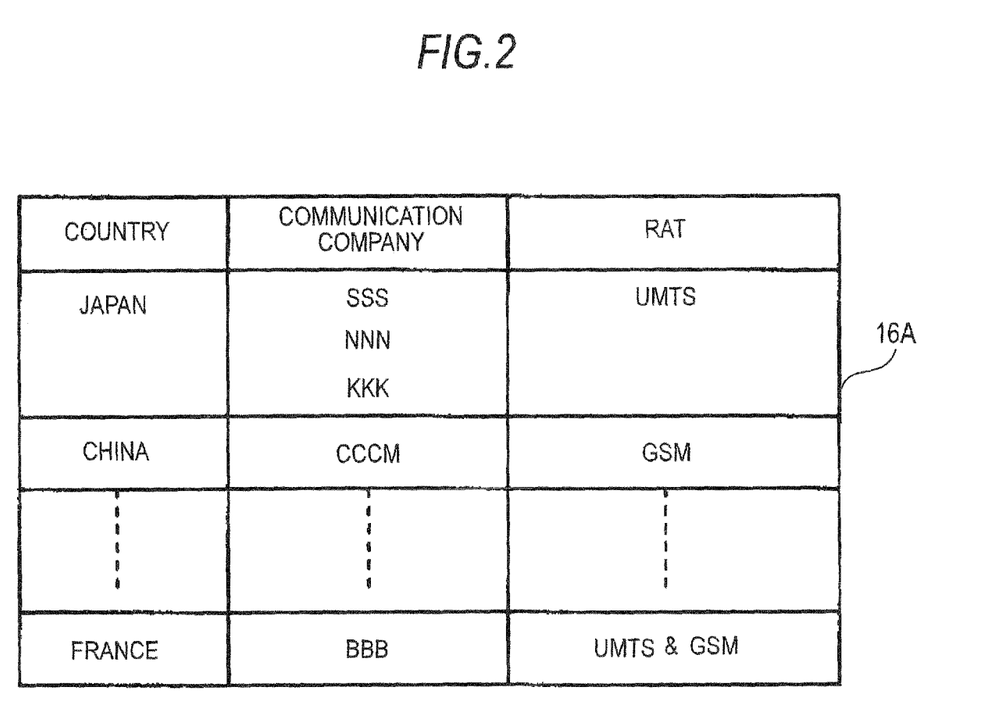
FIG. 2 shows an example country-RAT correspondence table which is stored in the cell phone according to the embodiment of the invention.

The USIM 14 is an information chip having a company information storing means which is stored with information of a company used by the subscriber of the cell phone concerned (i.e., information of a company of a home network; it also serves to identify a country). The cell phone concerned is configured in such a manner that an information chip containing information of a company used by the subscriber can be set therein. While the cell phone concerned is in use, the information chip should be set therein. The memory unit 16 is equipped with a country-by-country radio access technology information storing means 16A and a set RAT storing section 16B. Names of communication companies that provide networks and pieces of radio access technology (RAT) information are stored in the country-by-country radio access technology information storing means 16A so as to be correlated with respective countries in the form of a table shown in FIG. 2, for example. Radio access technology (RAT) information that is set in the cell phone concerned, more specifically, a UMTS only modes a GSM only node, or a UMTS/GSM dual mode, is stored in the set RAT storing section 16B.

Before radio access technology information is set in the set RAT storing section 16B (set information storing means), the radio wave search means 18 which is provided in the control section 10 performs a radio wave search according to one of a first radio access technology (UMTS) and a second radio access technology (GSM) on the basis of the company information that is stored in the USIM 14. The RAT setting means 19 functions as a setting means for setting information of a radio access technology to be used on the basis of a search result of the radio wave search means 18.

Figure 3:
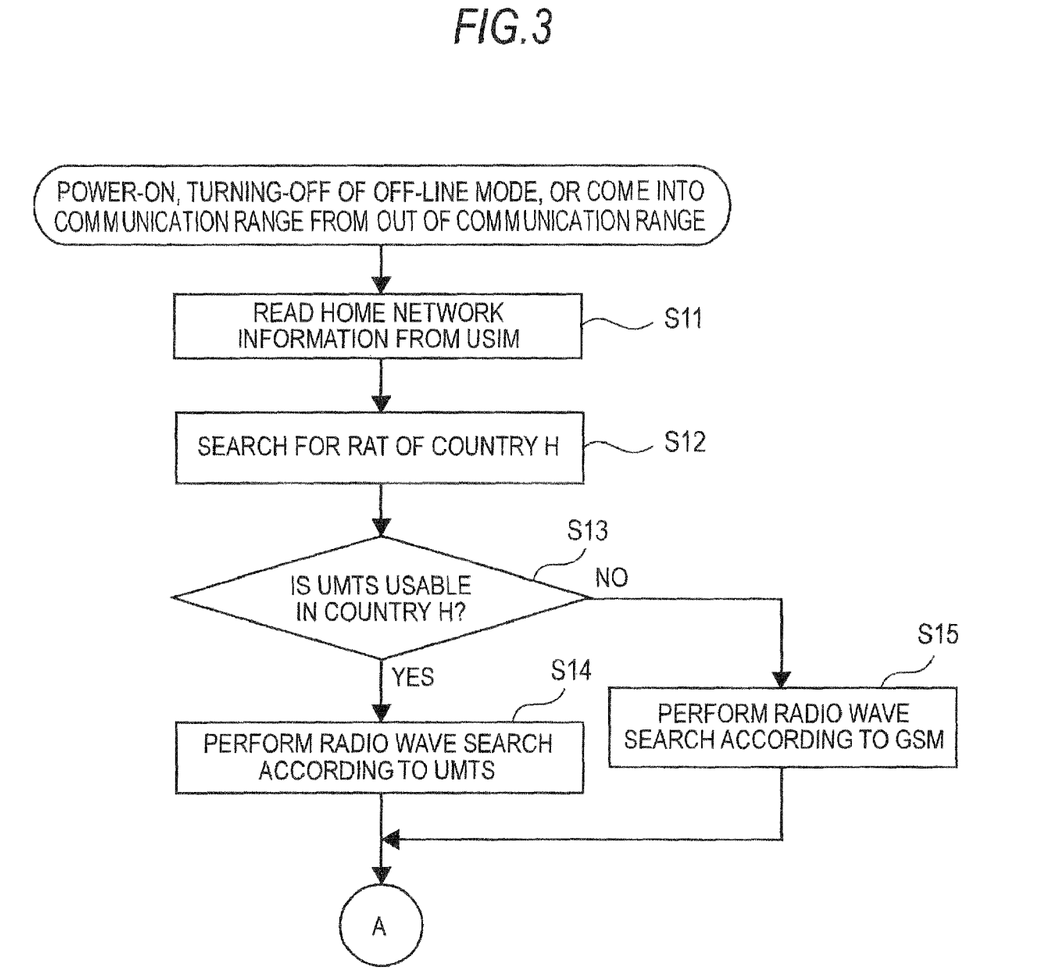
FIG. 3 is a flowchart of part of an optimum RAT setting process of the cell phone according to the embodiment of the invention.
Figure 4:
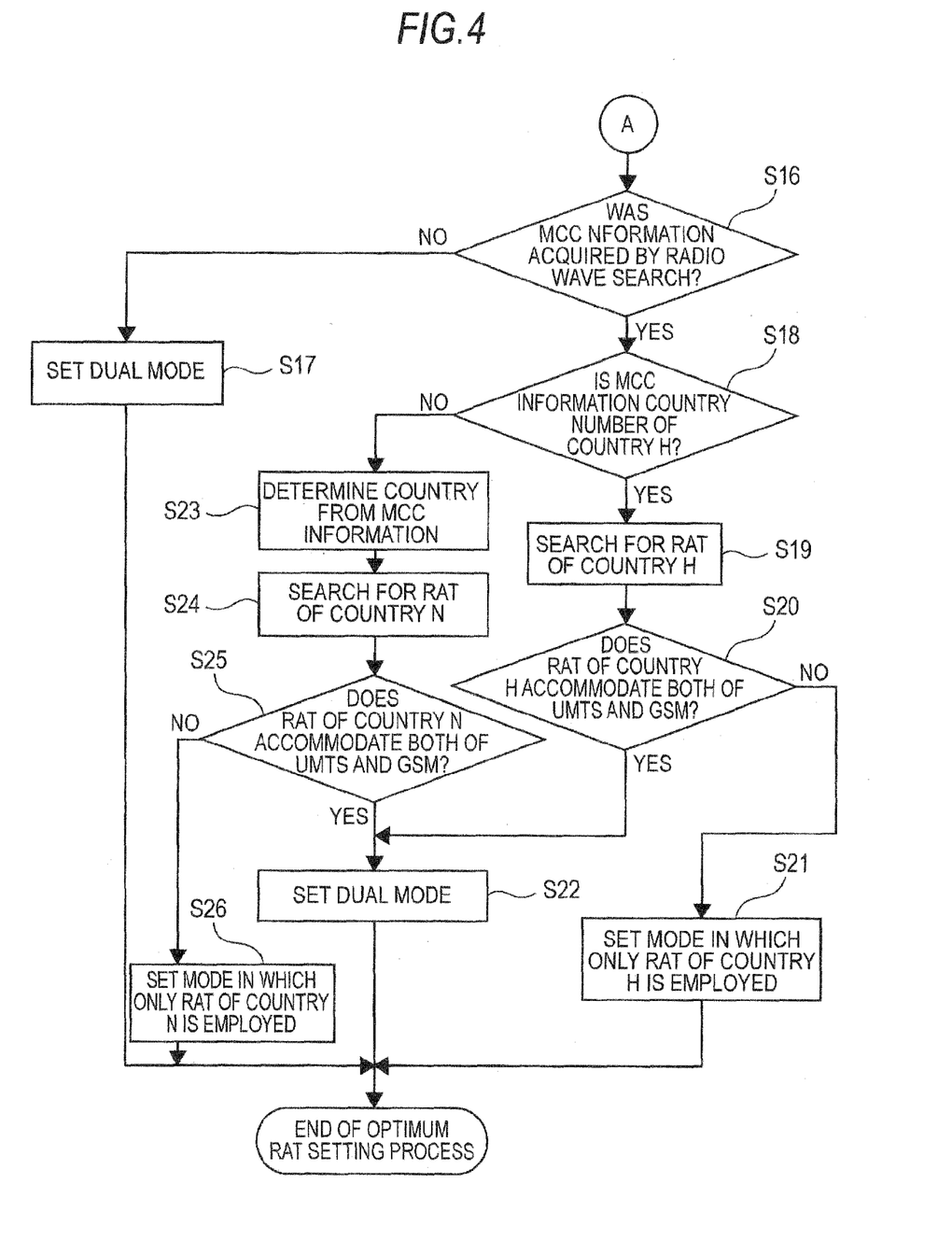
FIG. 4 is a flowchart of the other part of the optimum RAT setting process of the cell phone according to the embodiment of the invention.
Figure 5:
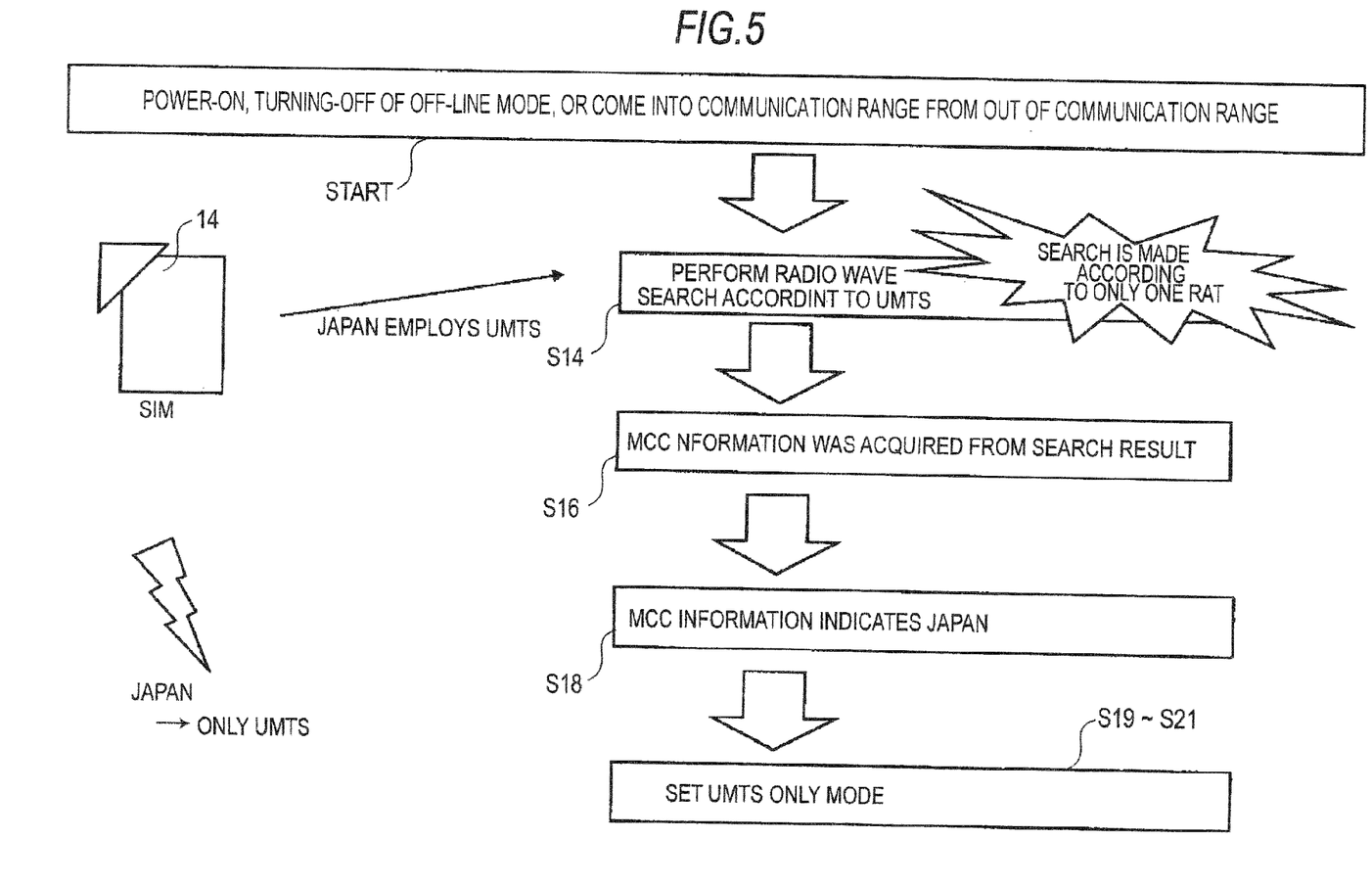
FIG. 5 is a flowchart showing a specific optimum RAT setting operation of the cell phone according to the embodiment of the invention.

The radio wave search means 18 and the RAT setting means 19 are implemented by the control section 10's running a program that corresponds to a flowchart shown in FIGS. 3 and 4. An RAT setting process of the cell phone according to the embodiment will be described below with reference to the flowchart of FIGS. 3 and 4.

The control section 10 detects a power-on manipulation made through the power switch 17 and a manipulation of turning off the off-line mode through the keyboard unit 27 when those manipulations are made. Furthermore, the control section 10 detects, via the communication processing section 20 and the antennas 23 and 24, whether a prescribed time has elapsed since reception of radio waves from a communication company was disabled (i.e., the cell phone went out of its communication range). If the control section 10 detects a power-on manipulation made through the power switch 17, a manipulation of turning off the off-line mode through the keyboard unit 27, or a fact that the cell phone comes into its communication range from out of the communication range, the process of the flowchart of FIGS. 3 and 4 is started.

At step S11, the control section 10 reads the home network information (company information) from the USIM 14 and determines a home network (communication company name) At step S12, the control section 10 determines country information (country H) and radio access technology (RAT) information of country H by referring to the country-by-country radio access technology information storing means 16A of the memory unit 16 on the basis of the home network information. At step S13, the control section 10 judges whether the determined radio access technology (RAT) information indicates the first radio access technology (UMTS).

If the judgment result of step S13 is "yes," at step S14 the control section 10 performs a radio wave search according to the first radio access technology (UMTS) via the communication processing section 20 and the antenna 23. If the judgment result of step S13 is "no," at step S15 the control section 10 performs a radio wave search according to the second radio access technology (GSM) via the communication processing section 20 and the antenna 24. In this manner, a radio wave search is performed according to only one radio access technology, whereby the search time and the power consumption are reduced.

At step S16, it is judged whether MCC information (country information) was acquired from information received by the radio wave search of step S14 or S15. If it is judged at step S16 that no MCC information (country information) could be acquired, the control section 10 sets the UMTS/GSM dual mode in the set RAT storing section 16B at step S17 and finishes the optimum RAT setting process. As a result, in an intermittent receiving operation which is performed every prescribed time, the cell phone operates in the UMTS/GSM dual mode that is set in the set RAT storing section 16B. In an intermittent receiving operation that is performed after the execution of the optimum RAT setting process, a radio wave search is performed according to both radio access technologies, that is, UMTS and GSM. However, the cell phone is not out of its communication range, the cell phone can perform a communication via a network that is supported by a communication company of the country concerned.

On the other hand, if it is judged at step S16 that MCC information (country information) was acquired, it is judged at step S18 whether the thus-found country coincides with the country (country H) where the home network exists that was determined at step S11. If it is judged that country found at step S16 coincides with country H, at step S19 the control section 10 determines a radio access technology (RAT) of country H by referring to the country-by-country radio access technology information storing means 16A. At step S20, the control section 10 judges whether the thus-determined radio access technology (RAT) accommodates both of the first radio access technology (UMTS) and the second radio access technology (GSM).

If it is judged at step S20 that the determined radio access technology (RAT) does not accommodate both of the first radio access technology (UMTS) and the second radio access technology (GSM), at step S21 the control section 10 sets, in the set RAT storing section 16B, the mode of the one radio access technology (UMTS mode or GSM mode) that was determined at step S19 as being employed in country H. Then, the optimum RAT setting process is finished. As a result, in an intermittent receiving operation which is performed every prescribed time, the cell phone operates in the UMTS only mode or the GSM only mode that is set in the set RAT storing section 16B. The cell phone can perform a communication over a network that is supported by a communication company of the country concerned If it is judged at step S20 that the determined radio access technology (RAT) accommodates both of the first radio access technology (UMTS) and the second radio access technology (GSM), the control section 10 sets the UMTS/GSM dual mode in the set RAT storing section 16B at step S22 and finishes the optimum RAT setting process. As a result, in an intermittent receiving operation which is performed every prescribed time, the cell phone operates in the UMTS/GSM dual mode that is set in the set RAT storing section 16B. In an intermittent receiving operation that is performed after the execution of the optimum RAT setting process, a radio wave search is performed according to both radio access technologies, that is, UMTS and GSM, whereby the cell phone can perform a communication over a network that is supported by a communication company of the country concerned.

If it is judged at step S18 that the country found does not coincide with the country (country H) where the home network exists, at step S23 the control section 10 determines a country (country N) from the MCC information (country information) At step S24, the control section 10 determines a radio access technology (RAT) of country N by referring to the country-by-country radio access technology information storing means 16A. At step S25, the control section 10 judges whether the thus-determined radio access technology (RAT) accommodates both of the first radio access technology (UMTS) and the second radio access technology (GSM).

If it is judged at step S25 that the determined radio access technology (RAT) does not accommodate both of the first radio access technology (UMTS) and the second radio access technology (GSM), at step S26 the control section 10 sets, in the set RAT storing section 16B, the mode of the only one radio access technology (UMTS mode or GSM mode) that was determined at step S23 as being employed in country H. Then, the optimum RAT setting process is finished. As a result, in an intermittent receiving operation which is performed every prescribed time, the cell phone operates in the UMTS only mode or the GSM only mode that is set in the set RAT storing section 16B. The cell phone can perform a communication over a network that is supported by a communication company of the country concerned.

If it is judged at step S25 that the determined radio access technology (RAT) accommodates both of the first radio access technology (UMTS) and the second radio access technology (GSM), the control section 10 sets the UMTS/GSM dual mode in the set RAT storing section 16B at step S22 and finishes the optimum RAT setting process. As a result, in an intermittent receiving operation which is performed every prescribed time, the cell phone operates in the UMTS/GSM dual mode that is set in the set RAT storing section 16B. In an intermittent receiving operation that is performed after the execution of the optimum RAT setting process, a radio wave search is performed according to both radio access technologies, that is, UMTS and GSM, whereby the cell phone can perform a communication over a network that is supported by a communication company of the country concerned.

FIGS. 5-8 show specific optimum RAT setting operations. FIGS. 5-8 employ the same step symbols as used in the flowchart of FIGS. 3 and 4. First, FIG. 5 corresponds to a case that the name of a Japanese communication company is stored in the USIM 14 as a communication company that operates a home network and an optimum RAT is to be set in Japan. In this example, Japan is found from the home network information that is stored in the USIM 14 and it is detected that Japan employs UMTS by referring to the country-by-country radio access technology information storing means 16A. At step S14, a radio wave search is performed according to the first radio access technology (UMTS). At steps S16 and S18, the country name "Japan" is acquired from MCC information (country information) that is acquired by reception of radio waves. Based on this country name, the UMTS only mode is set in the set RAT storing section 16B at steps S19-S21. As a result, the cell phone can perform a communication in Japan.

Figure 6:
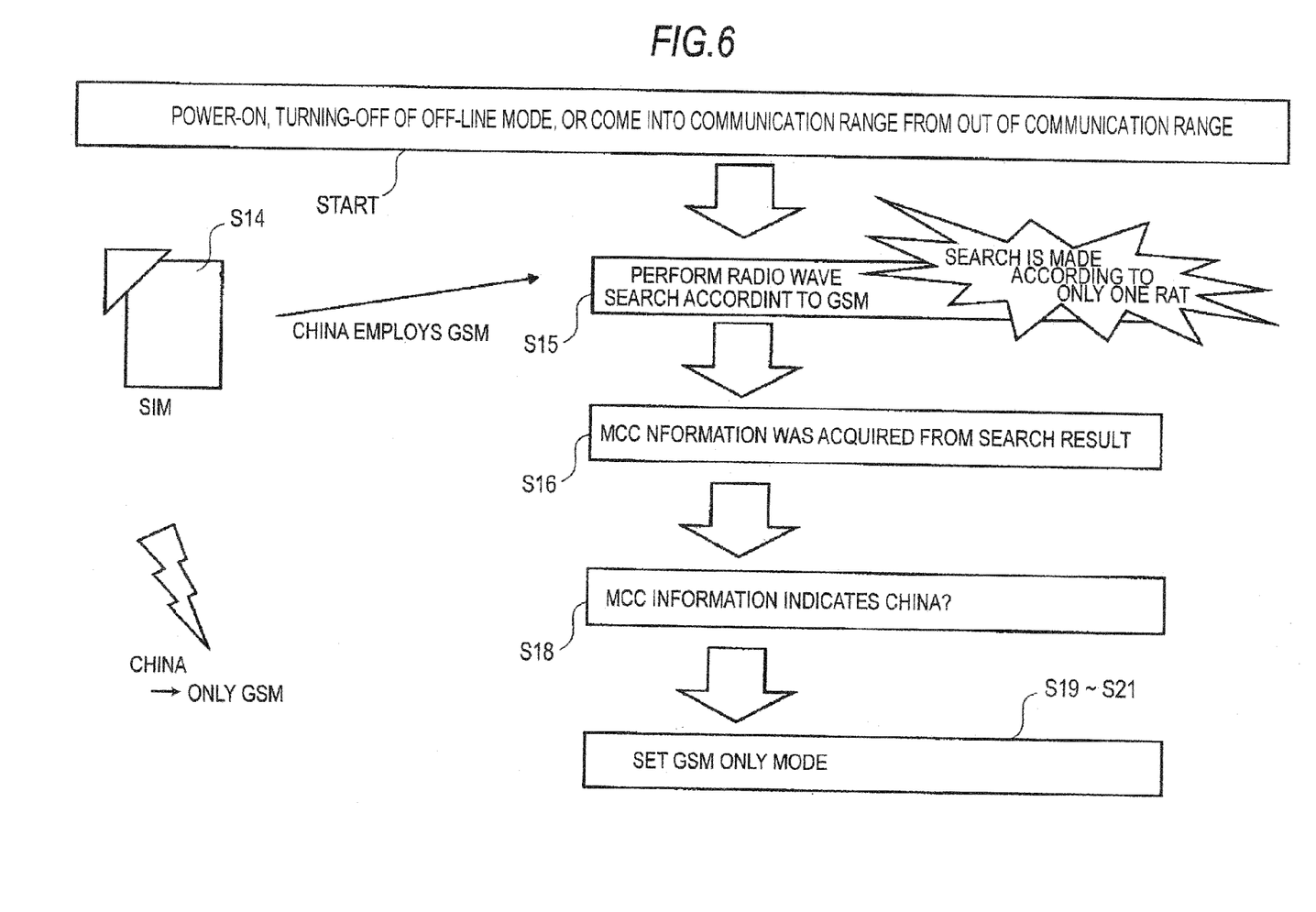
FIG. 6 is a flowchart showing another specific optimum RAT setting operation of the cell phone according to the embodiment of the invention.

FIG. 6 corresponds to a case that the name of a Chinese communication company is stored in the USIM 14 as a communication company that operates a home network and an optimum RAT is to be set in China. In this example, Chine is found from the home network information that is stored in the USIM 14 and it is detected that Chine employs GSM by referring to the country-by-country radio access technology information storing means 16A. At step S15, a radio wave search is performed according to the second radio access technology (GSM) At steps S16 and S18, the country name "China" is acquired from MCC information (country information) that is acquired by reception of radio waves. Based on this country name, the GMS only mode is set in the set RAT storing section 16B at steps S19-S21. As a result, the cell phone can perform a communication in China.

Figure 7:
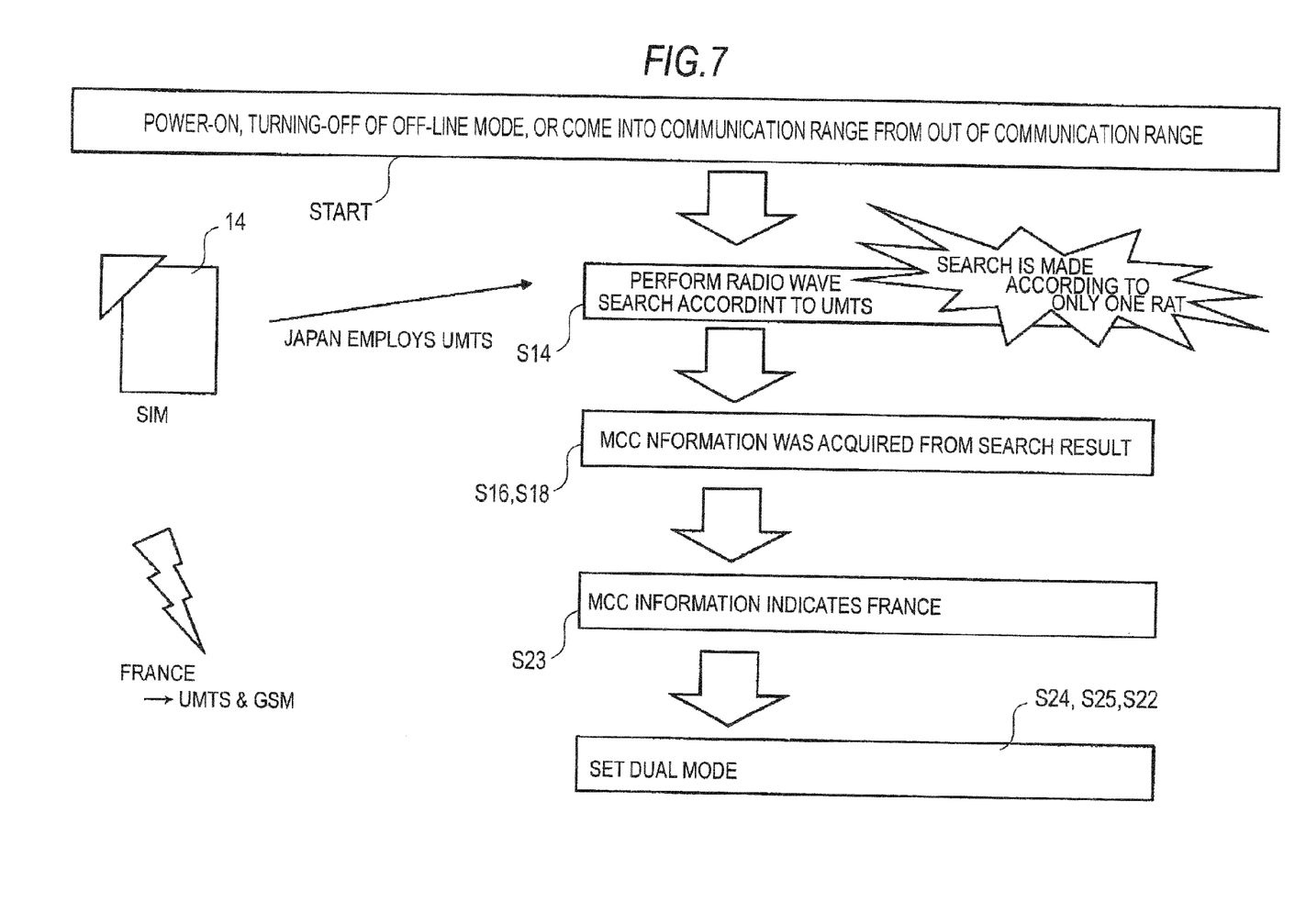
FIG. 7 is a flowchart showing still another specific optimum RAT setting operation of the cell phone according to the embodiment of the invention.

FIG. 7 corresponds to a case that the name of a Japanese communication company is stored in the USIM 14 as a communication company that operates a home network and an optimum RAT is to be set in France. In this example, Japan is found from the home network information that is stored in the USIM 14 and it is detected that Japan employs UMTS by referring to the country-by-country radio access technology information storing means 16A. At step S14, a radio wave search is performed according to the first radio access technology (UMTS) At steps S16, S18, and S23, the country name "France" is acquired from MCC information (country information) that is acquired by reception of radio waves. Based on this country name, it is found at steps S24 and S25 that France accommodates both of the first radio access technology (UMTS) and the second radio access technology (GSM). The UMTS/GMS dual mode is set in the set RAT storing section 16B at step S22. As a result, the cell phone can perform a communication in France according to either of UMTS and GSM.

Figure 8:
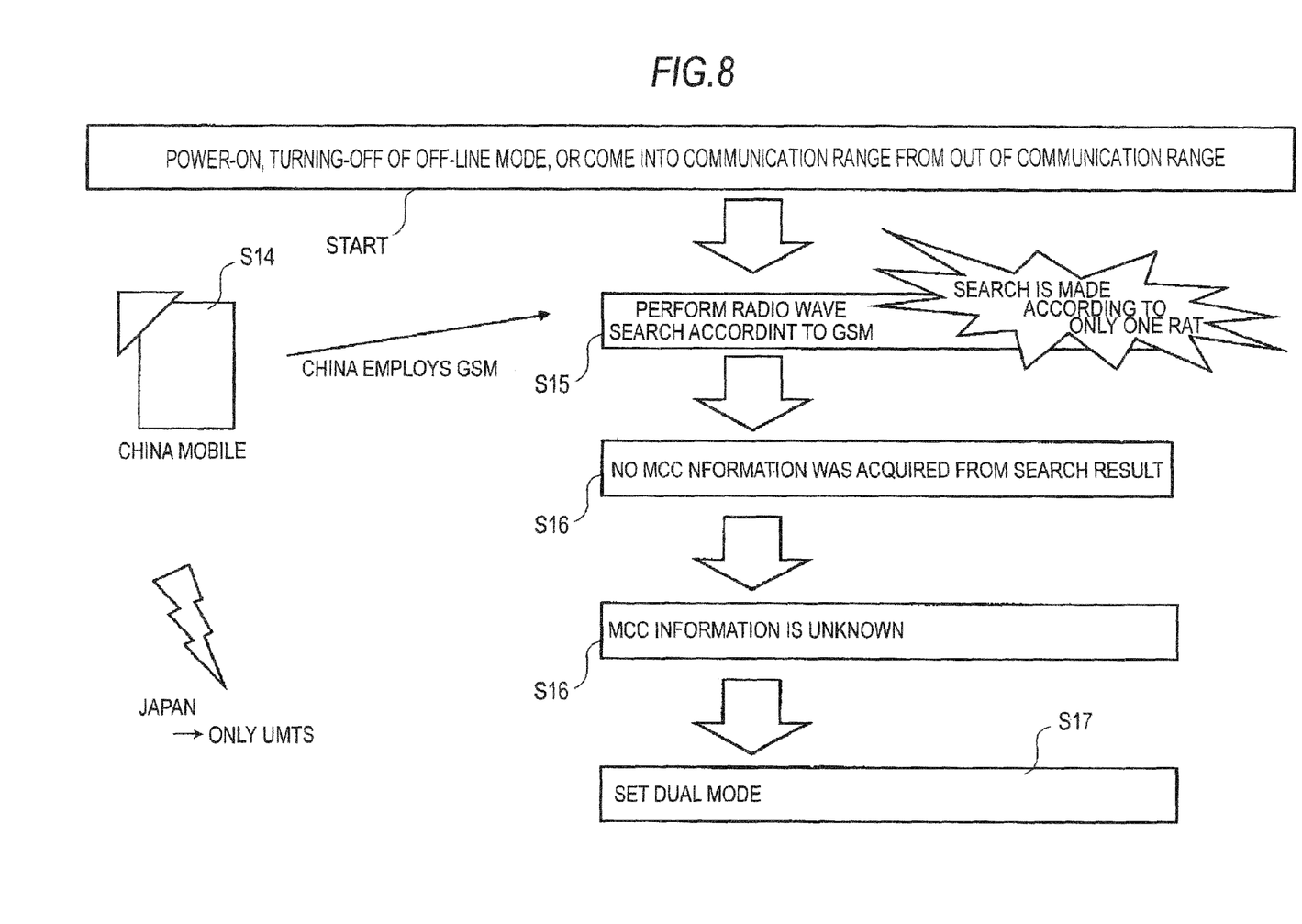
FIG. 8 is a flowchart showing a further specific optimum RAT setting operation of the cell phone according to the embodiment of the invention.

FIG. 8 corresponds to a case that the name of a Chinese communication company is stored in the USIM 14 as a communication company that operates a home network and an optimum RAT is to be set in Japan. In this example, Chine is found from the home network information that is stored in the USIM 14 and it is detected that Chine employs GSM by referring to the country-by-country radio access technology information storing means 16A. At step S15, on the basis of the home network information stored in the USIM 14, a radio wave search is performed according to the second radio access technology (GSM). It is judged at steps S16 that no MCC information (country information) could be acquired, because Japan employs UMTS and hence radio waves could not be received properly. Therefore, the control section 10 moves from step S16 to S17, where the UMTS/GMS dual mode is set in the set RAT storing section 16B. As a result, the cell phone in which the Chinese communication company name is stored as the home network can perform a communication in Japan which employs UMTS.

The above embodiment is directed to UMTS and GSM which are currently used radio access technologies. If another radio access technology is employed in the future, in the optimum RAT setting process a radio wave search will be performed using only one of plural radio access technologies. Instead of the dual mode (see FIG. 4), a mode is set in which all of the plural radio access technologies are used. This enables a communication.

Furthermore, the user may be allowed to set whether to execute the optimum RAT setting process. This enables proper setting if the user knows an RAT to be used. When it is detected that a country concerned employs plural radio access technologies, these candidate radio access technologies may be shown (e.g., displayed) to the user so that the user can select one of those. Still further, the user may be allowed to set whether to move to step S11 shown in FIG. 3 every prescribed cycle irrespective of whether the cell phone is within or out of its communication range, in addition to a case that one of the conditions shown in FIG. 3 is satisfied.

As described with reference to the embodiment, there is provided a communication terminal apparatus which makes it unnecessary for a user to make RAT setting and can reduce the radio wave search time and the power consumption.

In the communication terminal apparatus according to the embodiment, the company information stored in the company information storing means of the information chip that is set in the communication terminal apparatus is read out, a radio wave search is performed according to one of the first and second radio access technologies on the basis of the read-out company information, and information of radio access technology to be used is set on the basis of a result of the radio wave search. Therefore, the user is not required to make RAT setting. Furthermore, a radio wave search can be performed according to one radio access technology, which makes it possible to reduce the radio wave search time and the power consumption.

The communication terminal apparatus according to the embodiment further comprises the country-by-country radio access technology information storing means which is stored with pieces of radio access technology information in such a manner that they are correlated with respective countries. A country is determined using country number information that has been acquired through the radio wave search, and information of a radio access technology to be used is set on the basis of the information stored in the country-by-country radio access technology information storing means. Therefore, the user is not required to make RAT setting and an RAT can be set properly.

In the communication terminal apparatus according to the embodiment, if the radio wave search means has acquired no country number information through the radio wave search, the setting means sets information to the effect that both of the first and second radio access technologies should be used. Therefore, the user is not required to make RAT setting and an RAT can be set properly.

What is claimed is:

1. A communication apparatus comprising:
   a first communication module radio communicating based on a first radio access technology;
   a second communication module radio communicating based on a second radio access technology different from the first radio access technology;
   a first information storing module storing radio access technology information indicating at least one of the first and second radio access technologies to be used in a radio communication of the communication apparatus;
   a chip storing module configured to store an information chip that stores company information with respect to a company providing a communication service;
   a search module configured to read out the company information from the information chip to perform a radio wave search according to one of the first and second radio access technologies based on the company information; and
   a setting module configured to set the radio access technology information in the first information storing module based on the result of the radio wave search.

2. The communication apparatus according to claim 1 further comprising a second information storing module storing candidate radio access technology information correlated with country information,
   wherein the setting module sets the radio access technology information in the first storing module based on country information acquired by the radio wave search and the candidate radio access technology information.

3. The communication apparatus according to claim 2, wherein, when the search module acquires no country information through the radio wave search, the setting module set the radio access technology information indicating both of the first and second radio access technologies in the first information storing module.

4. A communication method for a communication apparatus having a chip storing module configured to store an information chip that stores company information with respect to a company providing a communication service, the communication apparatus conforming to a first radio access technology and a second radio access technology, the method comprising:
   performing a radio wave search according to one of the first and second radio access technologies based on the company information;
   setting a radio access technology to be used in a radio communication of the communication apparatus based on the result of the radio wave search.

5. The method according to claim 4,
   wherein country information is acquired in the radio wave search,
   wherein candidate radio access technology information correlated with country information is stored in the apparatus, and
   wherein the radio access technology is set based on the candidate radio access technology information corresponding to the country information.

6. The method according to claim 5,
   wherein, when no country information is acquired through the radio wave search, both of the first and second radio access technologies are set as the radio access technology to be used in the radio communication of the communication apparatus.

* * * * *